(12) United States Patent
Yamamoto

(10) Patent No.: US 8,089,511 B2
(45) Date of Patent: Jan. 3, 2012

(54) UNIVERSAL JOINT AND IMAGE DISPLAY UNIT

(75) Inventor: Masao Yamamoto, Tokyo (JP)

(73) Assignee: Scalar Corporation, Tokyo (JP)

( * ) Notice: Subject to any disclaimer, the term of this patent is extended or adjusted under 35 U.S.C. 154(b) by 719 days.

(21) Appl. No.: 11/814,955

(22) PCT Filed: Jan. 30, 2006

(86) PCT No.: PCT/JP2006/301902
§ 371 (c)(1),
(2), (4) Date: Nov. 14, 2008

(87) PCT Pub. No.: WO2006/080569
PCT Pub. Date: Aug. 3, 2006

(65) Prior Publication Data
US 2009/0102986 A1 Apr. 23, 2009

(30) Foreign Application Priority Data
Jan. 28, 2005 (JP) ................. 2005-022217

(51) Int. Cl.
*H04N 7/18* (2006.01)
*G02C 9/00* (2006.01)
(52) U.S. Cl. ............................ 348/115; 351/57; 351/158
(58) Field of Classification Search .................. 351/158, 351/57, 41; 348/115, 373, 374, 375, 376, 348/207.99, 333.01, 333.06, 333.07
See application file for complete search history.

(56) References Cited

U.S. PATENT DOCUMENTS
5,923,396 A * 7/1999 Ulvio ............................. 351/57

FOREIGN PATENT DOCUMENTS
| JP | 11-182529 | 7/1999 |
| JP | 2000-213524 | 8/2000 |
| JP | 2000-221439 | 8/2000 |
| JP | 2003-046903 | 2/2003 |
| WO | WO 03/046430 A1 | 6/2003 |

OTHER PUBLICATIONS
International Search Report Dated Apr. 18, 2006.

* cited by examiner

*Primary Examiner* — Hung Dang
(74) *Attorney, Agent, or Firm* — Plumsea Law Group, LLC

(57) ABSTRACT

Provided is a universal joint capable of freely regulating a mounting angle of one member with respect to the other member, and an image display unit using the same. The image display unit (1) includes an image display unit main body (100) having a convex surface (101) forming a part of a specific spherical surface, and an intermediate member (200). The intermediate member (200) includes a guide member (220) having a concave surface (221) that is a curved surface corresponding to the convex surface (101) and is supposed to come into contact with the convex surface (101) when the image display unit main body (100) and the intermediate member (200) are fixed to each other, and a magnet (230) provided at a position substantially the center of the guide member (220) and capable of being fixed to the convex surface (101) by attraction. When this convex surface (101) is allowed to slide on the concave surface (221), a mounting angle of the image display unit main body (100) with respect to the intermediate member (200) can be regulated.

11 Claims, 12 Drawing Sheets

(a)

UNIVERSAL JOINT AND IMAGE DISPLAY UNIT

TECHNICAL FIELD

The present invention relates to a universal joint and a small image display unit that can be attached to a part of a user's body such as a head when it is to be used.

BACKGROUND ART

A head mount display (HMD), which is attached to a part of a user's body such as a head when being used, and which displays an image in front of the eyes of the user, is used in various fields including a field of virtual reality. Usually, the HMD shout out external light to exclusively display an image, and it is generally formed in a goggle-like configuration or in a large-eyeglass-frame-like configuration. When using the HMD, the user can see the image in whichever direction the user may face. On the other hand, the user cannot see the external world.

In recent years, there has been proposed a small image display unit which displays an image in a part of a field of vision, making it possible to see both the external world and the image.

In this type of image display unit, it is possible to selectively watch either the external world or the image through movement of the line of vision, so the display unit is valuable in that it can be used in a daily life situation and it does not matter whether it is used indoors or outdoors.

While this type of image display unit is intended for attachment to an existing eyeglasses, eyeglasses vary in terms of presence/absence of a frame and of the material, thickness, etc. of the frame. In view of this, there is a demand for development of a technique enabling to easily attach an image display unit to any type of eyeglasses.

In order for an image display unit to be easily attached to any type of eyeglasses, it is necessary for the image display unit to be detachable with respect to the eyeglasses.

Further, it is necessary for the mounting angle of the image display unit with respect to the eyeglasses to be adjustable.

In the course of technical development taking those necessities into consideration, the inventor of the present invention focused attention to the fact that the flat surfaces of eyeglass lenses are element common to all eyeglasses, thereby inventing an image display unit as disclosed in Japanese Patent Application No. 2004-233912.

An image display unit according to the above-mentioned invention has an intermediate member that can be fixed to the flat surface of an eyeglass lens, and an image display unit main body equipped with a display means situated in front of one eye of the user during use of the image display unit, and a fixation means allowing detachable fixation to the intermediate member.

FIG. 8 is a perspective view showing of an image display unit main body 100 and an intermediate member 800 of an image display unit 10 of this type.

As shown in the figure, the intermediate member 800 is equipped with a plate-like base 210, and a foundation 820 protruding forwards from a front surface of the base 210 (In this specification, the word "front" means the side farther from the face of the user wearing the eyeglasses on his face). The foundation 820 has a concave surface 821 open on the front side when it is fixed to the eyeglass lens. The concave surface 821 constitutes a joint portion of the intermediate member 800 with respect to the image display unit main body 100. Further, on the rear surface of the base 210, there is provided an adhesive layer 240 formed by an adhesive in the form of a layer. By the presence of the adhesive layer 240, it is possible to fix the intermediate member 800 to the eyeglass lens.

The image display unit main body 100 is equipped with a case 110 formed substantially as a rectangular parallelepiped. On the rear surface of the case 110, there is provided a lens barrel 120. The lens barrel 120 is formed substantially as a cylinder. Inside the lens barrel 120, there is provided a magnifying lens 130. On the rear surface of the case 110, there is further provided a convex surface 101 as a fixing means. The convex surface 101 protrudes rearwards from the case 110 and constitutes a part of a predetermined spherical surface. The convex surface 101 constitutes a joint portion of the image display unit 100 with respect to the intermediate member 800.

For example, both the convex surface 101 and the concave surface 821 may be formed of magnets, or one of them may be formed of a magnet and the other of metal. That is, the convex surface 101 and the concave surface 821 are attracted and fixed to each other by a magnetic force.

FIG. 9 shows how the convex surface 101 of the image display unit main body 100 and the concave surface 821 of the intermediate member 800 are attracted and fixed to each other.

With the construction of the joint portion of the image display unit 10, it is possible to easily attach the image display unit 10 detachably to an eyeglass lens GL of any type of eyeglasses. Further, to change the mounting angle of the image display unit main body 100 with respect to the intermediate member 800 during use of the image display unit 10, it is possible to cause the convex surface 101 to slide with respect to the concave surface 821, with the intermediate member 800 and the image display unit main body 100 fixed to each other.

That is, the construction of this joint portion is used as a universal joint.

However, this universal joint is not without its problems to be solved. That is, the thickness of the end portion of the concave surface of this universal joint is larger than the thickness of the central portion thereof, and more magnetic lines of force are distributed on the outer side than in the inner side of the convex surface and the concave surface. The magnetic lines of force pass from the concave surface to the convex surface (or from the convex surface to the concave surface), and pass through the air from the convex surface (or from the concave surface) before returning to the concave surface (or the convex surface). The more magnetic lines of force existing on the outer side, the weaker the attracting force.

Further, due to their structures, the convex surface and the concave surface are attracted and fixed to each other firmly at the peripheral edge portion of the concave surface. The direction of the vector of the attraction force is an oblique one directed toward the central portions of the convex surface and the concave surface, so if the convex surface is slightly shifted with respect to the concave surface, the convex surface may be allowed to be restored to the former position, which means the attracting fixation cannot be effected in a stable manner. That is, if, to adjust one member to a predetermined angle with respect to the other member, the convex surface is caused to slide with respect to the concave member so that the central portion of the convex surface shown in FIG. 9 may move to a desired position, the convex surface returns to the former position, making it impossible to perform the mounting angle adjustment as desired.

Thus, in the universal joint constructed as described above, it is rather difficult to "freely" adjust the mounting angle of one member with respect to the other member.

It is accordingly an object of the present invention to improve the construction of the universal joint as described above and to provide a universal joint allowing the mounting angle of one member with respect to the other member to be freely adjusted and an image display unit to which such a universal joint is applied.

DISCLOSURE OF THE INVENTION

According to the present invention, in order to achieve the above-mentioned object, there is provided a universal joint including: a first member; and a second member which is detachable with respect to the first member and a mounting angle of which with respect to the first member can be adjusted, the first member has a convex surface constituting a part of a predetermined substantially spherical surface, in which the second member has: a guide member of a magnetic permeability higher than that of air having a concave surface substantially corresponding to the convex surface and supposed to come into contact with the convex surface when the first member and the second member are fixed to each other, one of the convex surface and the concave surface being slidable with respect to another one of the convex surface and the concave surface, with the concave surface and the convex surface being held in contact with each other; and a magnet provided at a position substantially the center of the guide member and capable of being detachably fixed to at least a part of the convex surface by attraction, and in which, by sliding one of the convex surface and the concave surface with respect to the another one of the convex surface and the concave surface, with the magnet being fixed to the convex surface by attraction, it is possible to adjust the mounting angle of one of the first member and the second member with respect to another one of the first member and the second member.

The universal joint has the guide member whose magnetic permeability is higher than that of air, so when the concave surface of the guide member and the convex surface are attracted and fixed to each other, the magnetic lines of force are not guided from the magnet to the convex surface, and from the convex surface to the magnet through the air, but are guided from the magnet to the convex surface, from the convex surface to the guide member, and from the guide member to the magnet (or from the magnet to the guide member, from the guide member to the convex surface, and from the convex surface to the magnet). That is, there is formed a closed-loop state of a magnetic flux from the magnet to the convex surface, from the convex surface to the guide member, and from the guide member to the magnet (or a closed-loop state of the magnetic flux from the magnet to the guide member, from the guide member to the convex surface, and from the convex surface to the magnet). In the present invention, the term "closed-loop state of the magnetic flux" means not only a state in which the magnetic flux forms a completely closed loop but also a state in which the magnetic flux forms a substantially closed loop even when there is involved some magnetic flux leakage.

In this way, in the present invention, there is formed the closed-loop state of the magnetic flux, so the magnetic lines of force hardly get to the exterior, which means the universal joint of the present invention exhibits an attraction force stronger than that of the above-mentioned universal joint. Further, since the closed-loop state of the magnetic flux as described above is formed, the vector of the attraction force is in the vertical direction, making it possible to effect attraction in a stable manner. Thus, there is no fear of the convex surface slightly shifted with respect to the concave surface being allowed to return to the former position, thus making it possible to freely adjust the mounting angle of one of the first member and the second member with respect to the other of the first member and the second member.

It is only necessary for the convex surface to be a surface constituting a part of a substantially spherical surface, and it is only necessary for the concave surface to be a surface substantially corresponding to the convex surface and supposed to come into contact with the convex surface when the first member and the second member are fixed to each other. For example, the convex surface may be formed as a convex surface constituting a part of a predetermined spherical surface, and the concave surface may be formed as a concave surface corresponding to the convex surface. Further, the convex surface may be formed as a surface of a truncated-cone-shaped outer surface configuration, and the concave surface may be formed as a surface corresponding to the convex surface.

Further, it is only necessary for the convex surface and the concave surface to substantially correspond to each other. For example, a convex surface of a truncated-cone-shaped outer surface configuration may be combined with a concave surface corresponding to a convex surface constituting a part of a predetermined spherical surface.

The guide member is necessary to have a concave surface substantially corresponding to the convex surface and supposed to come into contact with the convex surface when the first member and the second member are fixed to each other, allows one of the convex surface and the concave surface to slide with respect to the other of the convex surface and the concave surface, with the concave surface and the convex surface being held in contact with each other, and is formed of a material whose magnetic permeability is higher than that of air. For example, the guide member may be formed of iron in any configuration.

Further, there may be used an integrated member as the guide member. When using the integrated member, it is only necessary to attach one guide member to the second member, making it possible to facilitate the attachment of the guide member to the second member.

As the integrated member, it is possible to use, for example, a substantially cylindrical member having at one end thereof a concave surface.

The substantially cylindrical member may have a bottom portion. By using a guide member having a bottom portion, it is possible to attach a magnet to a position substantially at the center of the bottom portion in advance, so it is only necessary to attach the guide member with the magnet to attach the guide and the magnet to the second member, thus facilitating the attachment of the guide member and the magnet to the second member.

Note that, as a guide member, it is also possible to use a member having a plurality of protrusions. As the plurality of protrusions, for example, it is possible to use ones arranged at predetermined intervals around the magnet, with one end of each protrusion coming into contact with the convex surface when the first member and the second member are fixed to each other.

The magnet used may be of any type as long as it is provided in the axis of the guide member and can be fixed to at least a part of the convex surface by attraction. The magnet may be a commercially available columnar magnet. When the convex surface is a convex surface constituting a part of a predetermined spherical surface, and the concave surface is a concave surface corresponding to the convex surface, the magnet may have a concave surface corresponding to the convex surface and supposed to come into contact with the convex surface when the first member and the second member are fixed to each other. By using a magnet of the latter construction, it is possible to cause one of the convex surface and the concave surface to slide more smoothly with respect to the other of the convex surface and the concave surface.

As described above, when using, as the guide member, a substantially cylindrical member having a bottom portion, the magnet is fixed by attraction to the convex surface at a position substantially at the center of the bottom portion.

It is only necessary for the convex surface to be capable of being fixed to a magnet by attraction, and to be formed of a material attracted to a magnet such as a magnet or a ferromagnetic material.

The universal joint as described above including: a first member; and a second member which is detachable with respect to the first member and a mounting angle of which with respect to the first member can be adjusted, may be constructed as follows. That is: the first member has a convex surface constituting a part of a predetermined substantially spherical surface and is formed of a material attracted to a magnet; the second member has: a guide member of a magnetic permeability higher than that of air having a concave surface substantially corresponding to the convex surface and supposed to come into contact with the convex surface when the first member and the second member are fixed to each other; one of the convex surface and the concave surface being slidable with respect to another one of the convex surface and the concave surface, with the concave surface and the convex surface being held in contact with each other; and a magnet provided at a position substantially the center of the guide member and capable of being detachably fixed to at least a part of the convex surface by attraction; when the magnet is fixed to the convex surface by attraction, there is formed a closed-loop state of a magnetic flux from the magnet to the convex surface, from the convex surface to the guide member, and from the guide member to the magnet, or a closed-loop state of a magnetic flux from the magnet to the guide member, from the guide member to the convex surface, and from the convex surface to the magnet; and, by sliding one of the convex surface and the concave surface with respect to another one of the convex surface and the concave surface, with the magnet being fixed to the convex surface by attraction, it is possible to adjust the mounting angle of one of the first member and the second member with respect to another one of the first member and the second member.

According to the universal joint like this, as described above, it is possible to freely adjust the mounting angle of the one of the first member and the second member with respect to the another one of the first member and the second member.

In addition, the universal joint including: a first member; and a second member which is detachable with respect to the first member and a mounting angle of which with respect to the first member can be adjusted, may be constructed as follows. That is: the first member has a convex surface constituting a part of a predetermined substantially spherical surface and is formed of a material attracted to a magnet; the second member has a cylindrical magnet which has a bottom surface and whose upper surface substantially corresponds to the convex surface and is a concave surface that can be detachably fixed by attraction to the convex surface when the first member and the second member are fixed to each other, one of the convex surface and the concave surface being slidable with respect to another one of the convex surface and the concave surface, with the concave surface and the convex surface being held in contact with each other; when the magnet is fixed to the convex surface by attraction, there is formed a closed-loop state of a magnetic flux from the concave surface of the magnet to the convex surface, from the convex surface to the concave surface of the magnet, from the concave surface of the magnet to the bottom surface of the magnet, and from the bottom surface of the magnet to the concave surface of the magnet; and, by sliding one of the convex surface and the concave surface with respect to another one of the convex surface and the concave surface, with the magnet being fixed to the convex surface by attraction, it is possible to adjust the mounting angle of one of the first member and the second member with respect to another one of the first member and the second member.

The universal joint has no guide member, but has the cylindrical magnet having a bottom portion as described above, so when fixing the magnet to the convex surface by attraction, there is formed the closed-loop state of the magnetic flux from the concave surface of the magnet to the convex surface, from the convex surface to the concave surface of the magnet, from the concave surface of the magnet to the bottom surface, and from the bottom surface of the magnet to the concave surface of the magnet.

Also with the universal joint thus constructed, as described above, it is possible to freely adjust the mounting angle of the one of the first member and the second member with respect to the another one of the first member and the second member.

Further, the universal joint including: a first member; and a second member which is detachable with respect to the first member and a mounting angle of which with respect to the first member can be adjusted, may be constructed as follows. That is: the first member has a convex surface constituting a part of a predetermined substantially spherical surface and is formed of a material attracted to a magnet; the second member has: a first magnet that is a cylindrical magnet which has a bottom surface and whose upper surface substantially corresponds to the convex surface and is a concave surface that can be detachably fixed by attraction to the convex surface when the first member and the second member are fixed to each other, one of the convex surface and the concave surface being slidable with respect to another one of the convex surface and the concave surface, with the concave surface and the convex surface being held in contact with each other; and a second magnet provided at a position substantially the center of the first magnet and capable of being detachably fixed by attraction to a part of the convex surface; when the first magnet and the second magnet are fixed to the convex surface by attraction, there is formed a closed-loop state of a magnetic flux from the first magnet to the convex surface, from the convex surface to the second magnet, and from the second magnet to the first magnet, or a closed-loop state of a magnetic flux from the first magnet to the second magnet, from the second magnet to the convex surface, and from the convex surface to the first magnet; and by sliding one of the convex surface and the concave surface with respect to the another one of the convex surface and the concave surface, with the first magnet and the second magnet being fixed to the convex surface by attraction, it is possible to adjust the mounting angle of one of the first member and the second member with respect to another one of the first member and the second member.

The universal joint does not have a guide member either. However, it has the first magnet and the second magnet as described above, so when fixing those magnets to the convex surface by attraction, there is formed the closed-loop state of the magnetic flux from the first magnet to the convex surface, from the convex surface to the second magnet, and from the second magnet to the first magnet, or the closed-loop state of the magnetic flux from the first magnet to the second magnet, from the second magnet to the convex surface, and from the convex surface to the first magnet.

Note that, the first magnet and the second magnet may be or may not be integrated.

Also, with the universal joint, as described above, it is possible to freely adjust the mounting angle of the one of the first member and the second member with respect to another one of the first member and the second member.

In addition, according to the present invention, there is provided an image display unit, which is attached to an eyeglass lens, which is a lens of an eyeglasses which is worn by a user, to be used, including: an intermediate member that can be fixed to a smooth surface of the eyeglass lens; and an image display unit main body which is situated in front of one eye of the user when the image display unit is in use, including: a display means which guides image light of a predetermined image to the one eye to make it possible to watch the image with the one eye in a state in which the image exists within a display range that is a part of a field of vision of the one eye; and a fixing means enabling the image display unit main body to be detachably fixed to the intermediate member, in which the intermediate member is one of the first member and the second member according to the universal joint of the present invention as described above, and in which the fixing means is the other of the first member and the second member according to the universal joint of the present invention.

That is, according to the image display device using the universal joint of the present invention as described above, it is possible to freely adjust the mounting angle of the one of the first member and the second member with respect to the another one of the first member and the second member.

Further, according to the present invention, there is provided an image display unit, which is attached to an eyeglass lens which is a lens of an eyeglasses which is worn by a user or to an eyeglass frame which is a frame of the pair of eyeglasses, to be used, including: an intermediate member that can be detachably fixed to a peripheral edge portion of the eyeglass lens or to at least a part of the eyeglass frame; and an image display unit main body which is situated in front of one eye of the user when the image display unit is in use, including: a display means which guides image light of a predetermined image to the one eye to make it possible to watch the image with the one eye in a state in which the image exists within a display range that is a part of a field of vision of the one eye; and a fixing means enabling the image display unit main body to be detachably fixed to the intermediate member, in which the intermediate member is one of the first member and the second member according to the universal joint of the present invention, and in which the fixing means is the other of the first member and the second member according to the universal joint of the present invention.

Unlike the above-mentioned image display unit, the image display unit of the present invention is constructed such that the intermediate member is detachably fixed to at the least a part of an eyeglass lens or of an eyeglass frame, and is attached to the intermediate member on eyeglass lens or the eyeglass frame when it is to be used.

Also, in the image display unit, the universal joint according to the present invention as described above is used. Consequently, it is possible to freely adjust the mounting angle of the one of the first member and the second member with respect to the another one of the first member and the second member.

BEST MODE FOR CARRYING OUT THE INVENTION

Figure 1:
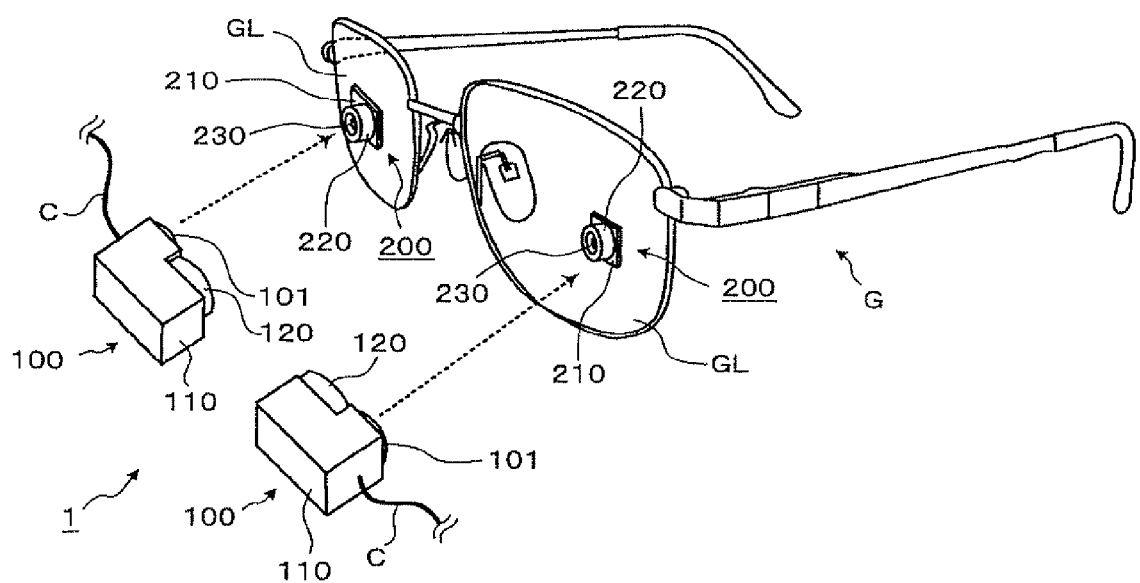
FIG. 1 is an overall perspective view, as seen from above and from the front side, of an image display unit according to a first embodiment.

In the following, preferred embodiments of an image display unit to which the universal joint of the present invention is applied will be described in detail with reference to the drawings. In the following description of the embodiments, the components common to the embodiments are indicated by the same reference numerals, and a redundant description thereof will be omitted in some cases.

First Embodiment

FIG. 1 is a perspective view, as seen from above and from the front side, of an image display unit 1 according to the first embodiment.

As shown in the drawing, the image display unit 1 of the first embodiment is equipped with two image display unit bodies 100 to be attached to the flat surfaces of eyeglass lenses GL of an eyeglasses G, and is equipped with two intermediate members 200 for attaching the image display unit bodies 100 respectively to the flat surfaces of the eyeglass lenses GL.

The universal joint of the present invention is applied to the joint portions connecting the image display unit bodies 100 and the intermediate members 200.

First, the construction of the image display unit 1 will be described.

During use of the image display unit 1, each of the image display unit bodies 100 is situated in front of one eye of the user, guiding image light of a predetermined image to the eye which it is situated in front. The user can watch the predetermined image in a state in which the predetermined image exists within a display range, which constitutes a part of the field of vision of each of the right and left eyes.

Figure 8:
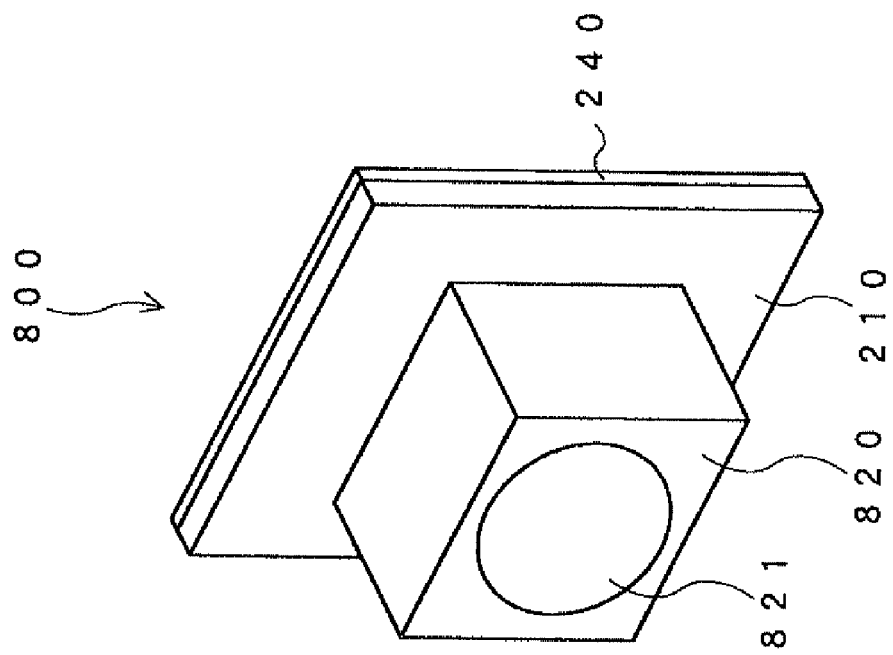
FIG. 8 is a perspective view of an image display unit main body and an intermediate member of a conventional image display unit.
Figure 8:
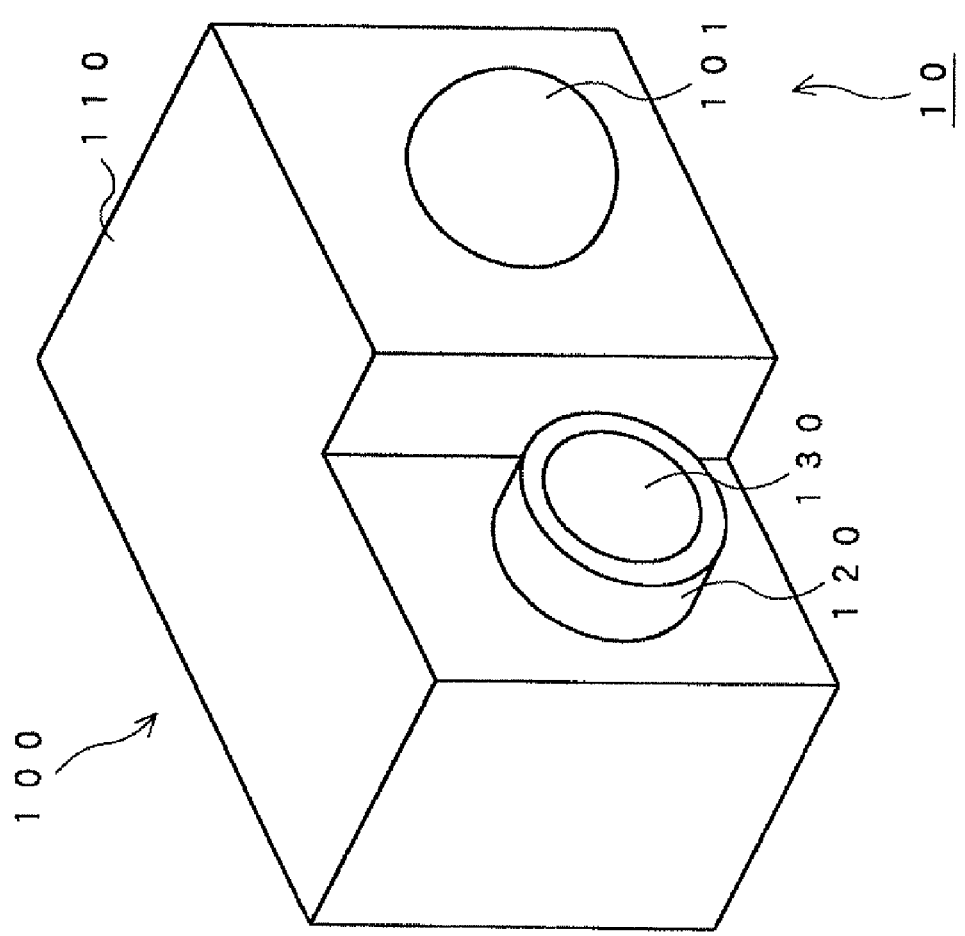
Figure 9:
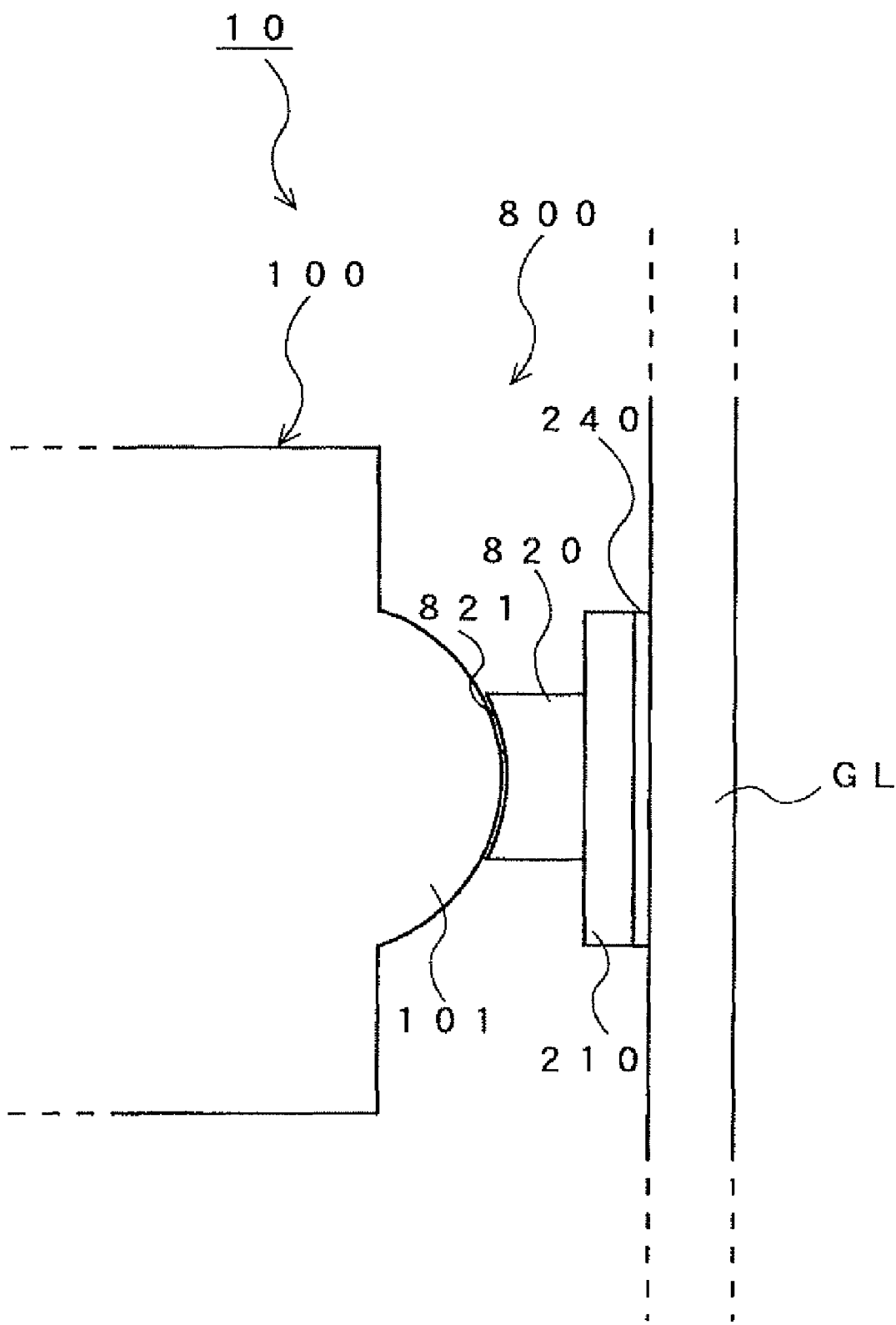
FIG. 9 is a side view illustrating a state where the conventional image display unit is in use.

The image display unit main body 100 is the same as the image display unit main body 100 shown in FIG. 8. As stated above, on the rear surface of the case 110, there is provided the convex surface 101 constituting the joint portion of the image display unit main body 100 with respect to the intermediate member 200. While in this embodiment the convex surface 101 is a curved surface constituting a part of a predetermined spherical surface formed of a ferromagnetic material such as iron or nickel, it is only necessary for the convex surface to substantially constitute a part of a predetermined spherical surface. Further, it may be formed of a material attracted to a magnet such as a magnet or metal.

As shown in FIG. 1, each image display unit main body 100 is connected to a cable C for transmitting an image signal to the image display unit main body 100. The cable C is connected to the outer side surface of the each image display unit main body 100 (which corresponds to a side surface of the face of the user wearing the eyeglasses G with the image display unit bodies 100 attached thereto).

Each case 110 contains a liquid crystal display (not shown), a conversion board (not shown) connected to the cable C and adapted to convert an image signal transmitted from the outside through the cable C into a form that can be displayed on the liquid crystal display to display an image on the liquid crystal display, a back light for illuminating the liquid crystal display from behind, and a control circuit for controlling this back light, and is equipped with a back light unit (not shown) for lighting the back light while performing control, and a magnifying lens (not shown in FIG. 1) for magnifying the image light of the image displayed on the liquid crystal display.

Figure 2A:
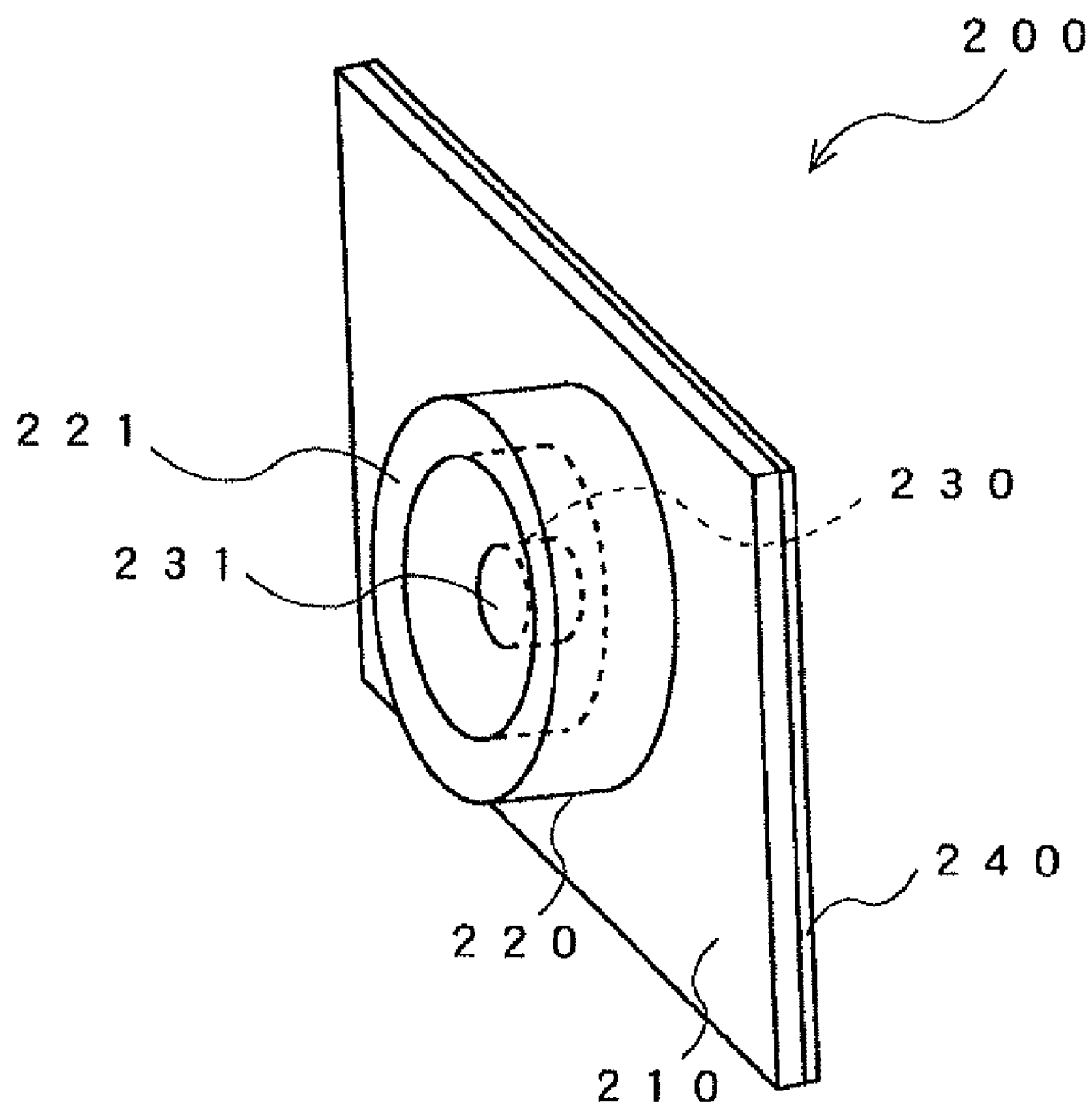
FIG. 2A is a perspective view of a guide member shown in FIG. 1.

FIG. 2A is a perspective view of the intermediate member 200. The intermediate member 200 can be fixed to the flat surface of an eyeglass lens GL.

Each of the two intermediate member 200 is equipped with the plate-like base 210, a guide member 220 forwardly protruding from the front surface of the base 210, and a magnet 230.

The guide member 220 is a cylindrical member having a bottom portion fixed to the base 210, and has at its forward end a concave surface 221 which is a curved surface corresponding to the convex surface 101 and which is supposed to come into contact with the convex surface 101 when the image display unit main body 100 and the intermediate member 200 are fixed to each other. The guide member 220 is formed so as to allow one of the convex surface 101 and the concave surface 221 to slide with respect to the other of the convex surface 101 and the concave surface 221, with the concave surface 221 and the convex surface 101 being held in contact with each other. In this embodiment, described below, the guide member 220 is formed of iron.

While in this embodiment the guide member 220 is as described above, the guide member may be of any type as long as it is formed so as to allow one of the convex surface 101 and the concave surface 221 to slide with respect to the other of the convex surface 101 and the concave surface 221, with the concave surface 221 and the convex surface 101 being held in contact with each other, and is formed of a material whose magnetic permeability is higher than that of air. As such a guide member, it is possible, for example, to use an integrated member as in the case of the guide member 220 of this embodiment, or a plurality of members not integrated. It may also be a cylindrical member having no bottom portion. When the guide member is an integrated member, it is only necessary to attach one guide member to the base 210 to attach only one guide member, which helps to save time and effort. As a guide member composed of a plurality of members, it is possible, for example, to use one in which a plurality of protrusions are arranged at predetermined intervals around the magnet 230, with one end of each protrusion coming into contact with the convex surface 101 when the image display unit main body 100 and the intermediate member 200 are fixed to each other.

Figure 2B:
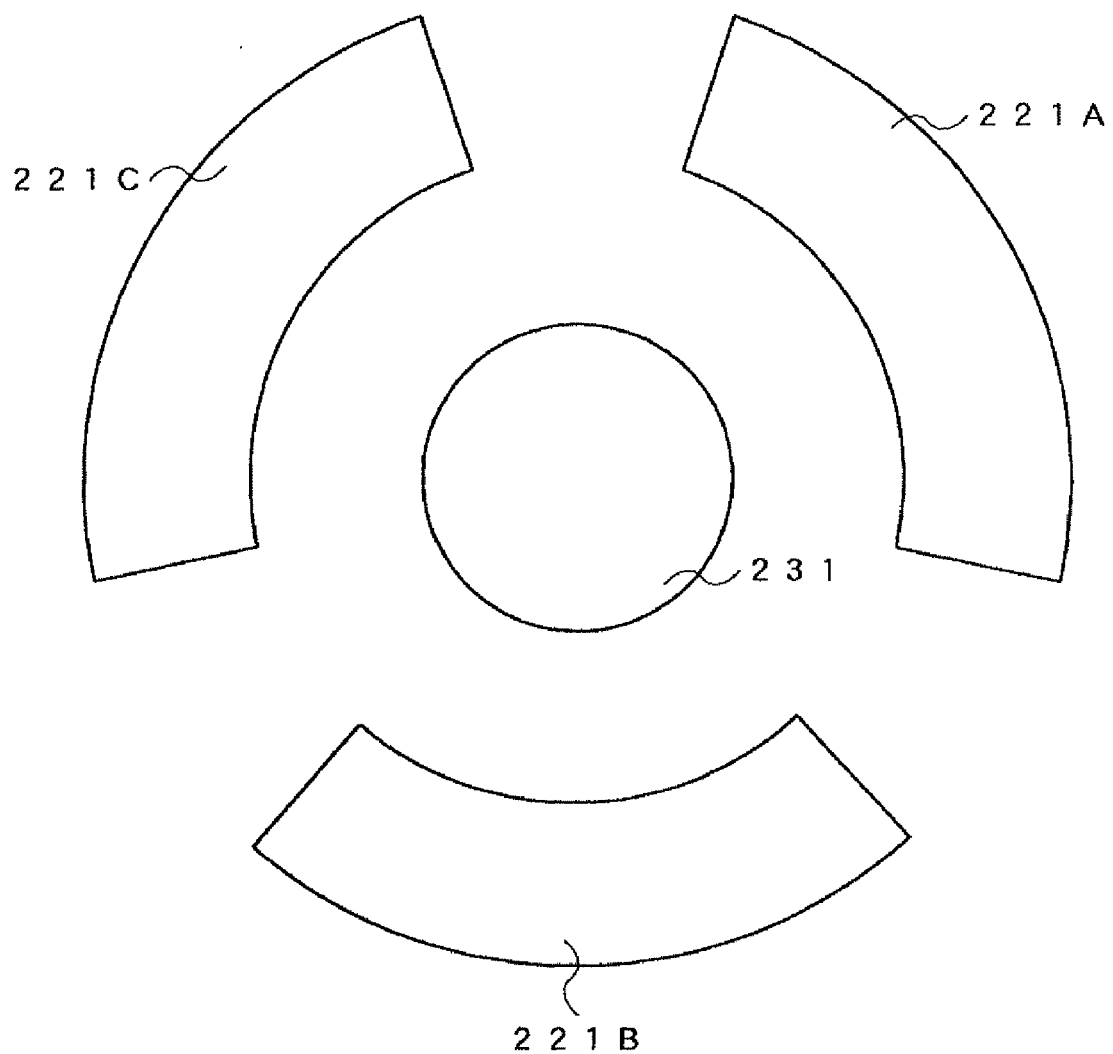
FIG. 2B is a front view of an example of an intermediate member composed of a plurality of members.

The guide member composed of a plurality of members may have a member which is, as shown in FIG. 2B, composed of concentrically arranged members 221A, 221B, and 221C of a fan-shaped sectional configuration.

The magnet 230 is mounted to a position substantially at the center of the bottom portion of the guide member 220. The magnet 230 has a concave surface 231 which is a curved surface corresponding to the convex surface 101 and which is supposed to come into contact with the convex surface 101 when the image display unit 100 and the intermediate member 200 are fixed to each other. The magnet 230 has a magnetic force large enough to allow it to be detachably fixed to at least a part of the convex surface 101 by attraction. This should not be construed restrictively. However, in the magnet 230 of this embodiment, the surface in contact with the convex surface 101 is the N-pole, and the surface on the back side thereof in contact with the guide member 220 is the S-pole. The polarity imparted to the magnet 230 may be reverse to the above. The magnet 230 of this embodiment is constructed as described above. However, it is possible to use any type of magnet as long as it is provided at a position substantially at the center of the guide member 220 and can be fixed by attraction to at least a part of the convex surface 101. While providing the magnet with the concave surface 231 makes smoother sliding movement possible, it is also possible to use a columnar magnet or the like equipped with a flat surface as an upper surface instead of the concave surface 231.

The guide member 220 of this embodiment has a bottom portion, and the magnet 230 can be previously attached to a position substantially at the center of the bottom portion, so there is no need to attach the magnet 230 to the base and then attach the guide member such that this magnet is situated substantially at the center of the guide member, thus facilitating the attachment of the guide member and the magnet to the base.

The guide member 220 and the magnet 230 described above constitute the joint portion of the intermediate member 200 with respect to the image display unit main body 100.

The base 210 is formed as a square plate of a size not blocking the opening portion of the lens barrel 120 when mounting the image display unit main body 100 to the intermediate member 200.

Behind the base 210, there is provided the adhesive layer 240 formed by adhesive in the form of a layer. The surface of the adhesive layer 240 is held in contact with the flat surface of the eyeglass lens GL, whereby the intermediate member 200 can be fixed to the eyeglass lens GL. As will be described below, the image display unit main body 100 is attached to the intermediate member 200 attached to the eyeglass lens GL.

The adhesive layer 240 has an adhesive force large enough to fix the intermediate member 200 with the image display unit main body 100 attached thereto to the eyeglass lens GL in a stable manner. In this embodiment, however, the adhesive layer 240 is detachably attached to the eyeglass lens GL.

While in this embodiment the base 210 is as described above, it is also possible for the adhesive layer 240 to be formed so as to be permanently fixed to the eyeglass lens, or the attachment to the eyeglass lens GL may be effected by using some other member than the adhesive layer 240.

Next, the attachment of the image display unit main body 100 to the eyeglass lens GL when using the image display unit 1 constructed as described above will be described.

This attachment is effected first by attaching the intermediate member 200 to the front surface of the eyeglass lens GL. To effect this attachment, the adhesive layer 240 of the intermediate member 200 is held in contact with an appropriate position of the eyeglass lens GL and is pressed against the same.

Next, the image display unit main body 100 is attached to the intermediate member 200. To effect this attachment, the convex surface 101 is brought close to the concave surface 221, and the magnet 230 and the convex surface 101 are caused to be attracted to each other by a magnetic force.

In this way, the image display unit main body 100 is fixed to the front surface of the eyeglass lens GL through the intermediation of the intermediate member 200.

Figure 3A:
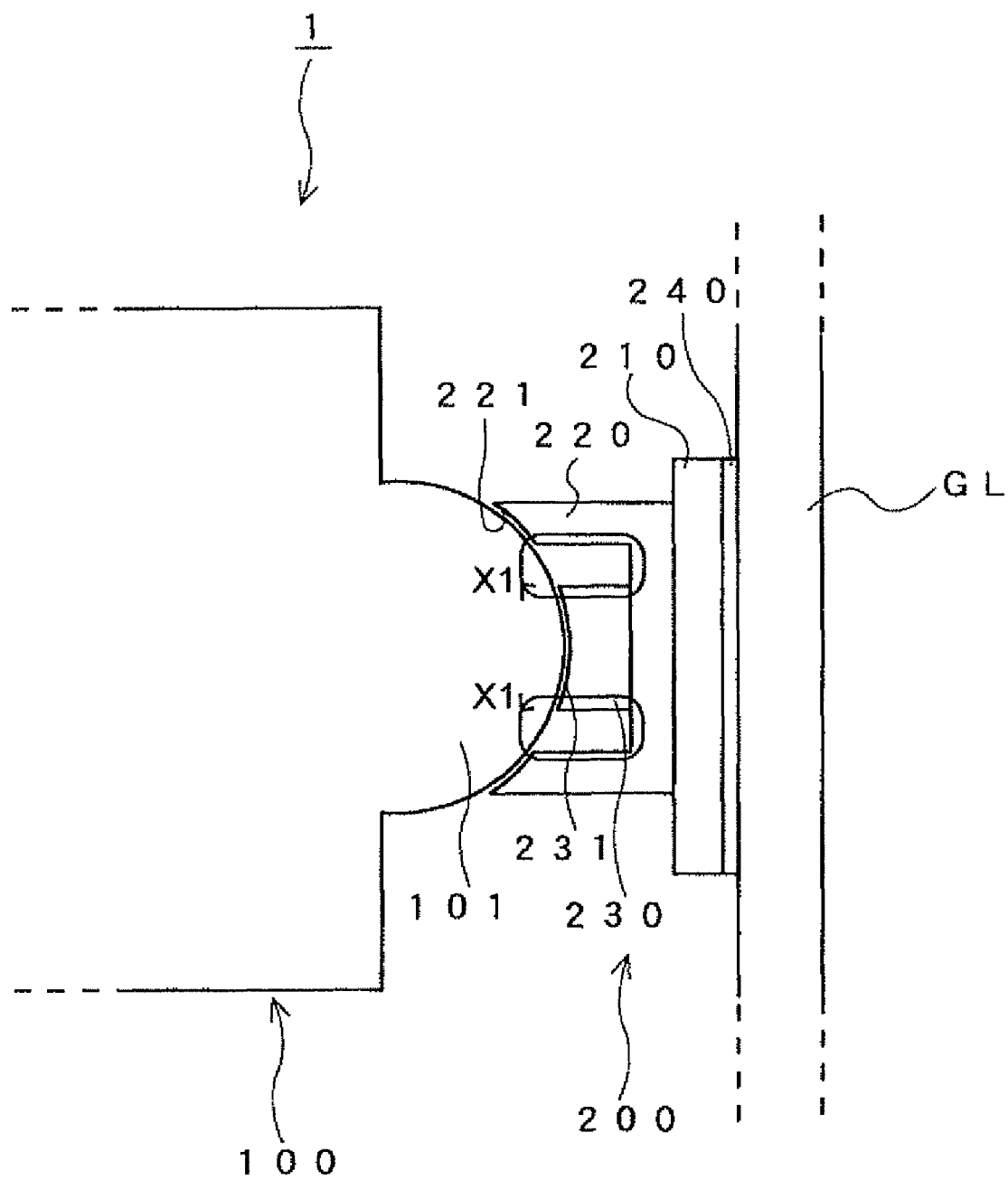
FIG. 3A is a side sectional view illustrating a state where the image display unit of FIG. 1 is in use.

FIG. 3A shows a state of the image display unit main body 100 as attached to the eyeglass lens GL.

As described above, in the joint portion between the image display unit main body 100 and the intermediate member 200, a part of the convex surface 101 and the magnet 230 are attracted to each other, whereby it is possible to detachably fix the intermediate member 200 and the image display unit main body 100 to each other.

In the construction of this joint portion, the intermediate member 200 has the guide member 220 of high magnetic permeability, so, in this embodiment, when the concave surface 221 and the convex surface 101 are fixed to each other by attraction, the magnetic lines of force are guided from the magnet 230 to the convex surface 101, from the convex surface 101 to the guide member 220, and from the guide member 220 to the magnet 230 as indicated by the arrows X1 as shown in FIG. 3A. When the polarity is reversed, the direction of the arrows is reversed, and the magnetic lines of force are guided from the magnet 230 to the guide member 220, from the guide member 220 to the convex surface 101, and from the convex surface to the magnet 230. That is, there is formed a closed-loop state of the magnetic flux from the magnet 230 to the convex surface 101, from the convex surface 101 to the guide member 220, and from the guide member 220 to the magnet 230 (or a closed-loop state of the magnetic flux from the magnet 230 to the guide member 220, from the guide member 220 to the convex surface 101, and from the convex surface 101 to the magnet 230). In this case, the magnetic lines of force pass through the inside of the magnet 230, the convex surface 101, and the guide member 220 do not get to the outside, so the attraction force due to this joint portion is strong. Further, due to the formation of a closed-loop state of the magnetic flux as described above, the vector direction of the attraction force is vertical, making it possible to effect attraction in a stable manner.

Thus, when the convex surface 101 is slightly shifted with respect to the concave surface 221, there is no fear of the convex surface 101 being allowed to be restored to the former position, thus making it possible to freely adjust the mounting angle of the image display unit main body 100. That is, it is possible to adjust the mounting angle of the image display unit main body 100 in a desired direction, such as the vertical direction, the horizontal direction, or an oblique direction, with the image display unit main body being attached to the front surface of the eyeglass lens GL.

In this embodiment, the term "closed-loop state of the magnetic flux" means not only a state in which the magnetic flux forms a completely closed loop but also a state in which the magnetic flux forms a substantially closed loop even if there is involved some magnetic flux leakage. This also applies to the following embodiments.

(Modification 1)

Figure 3B:
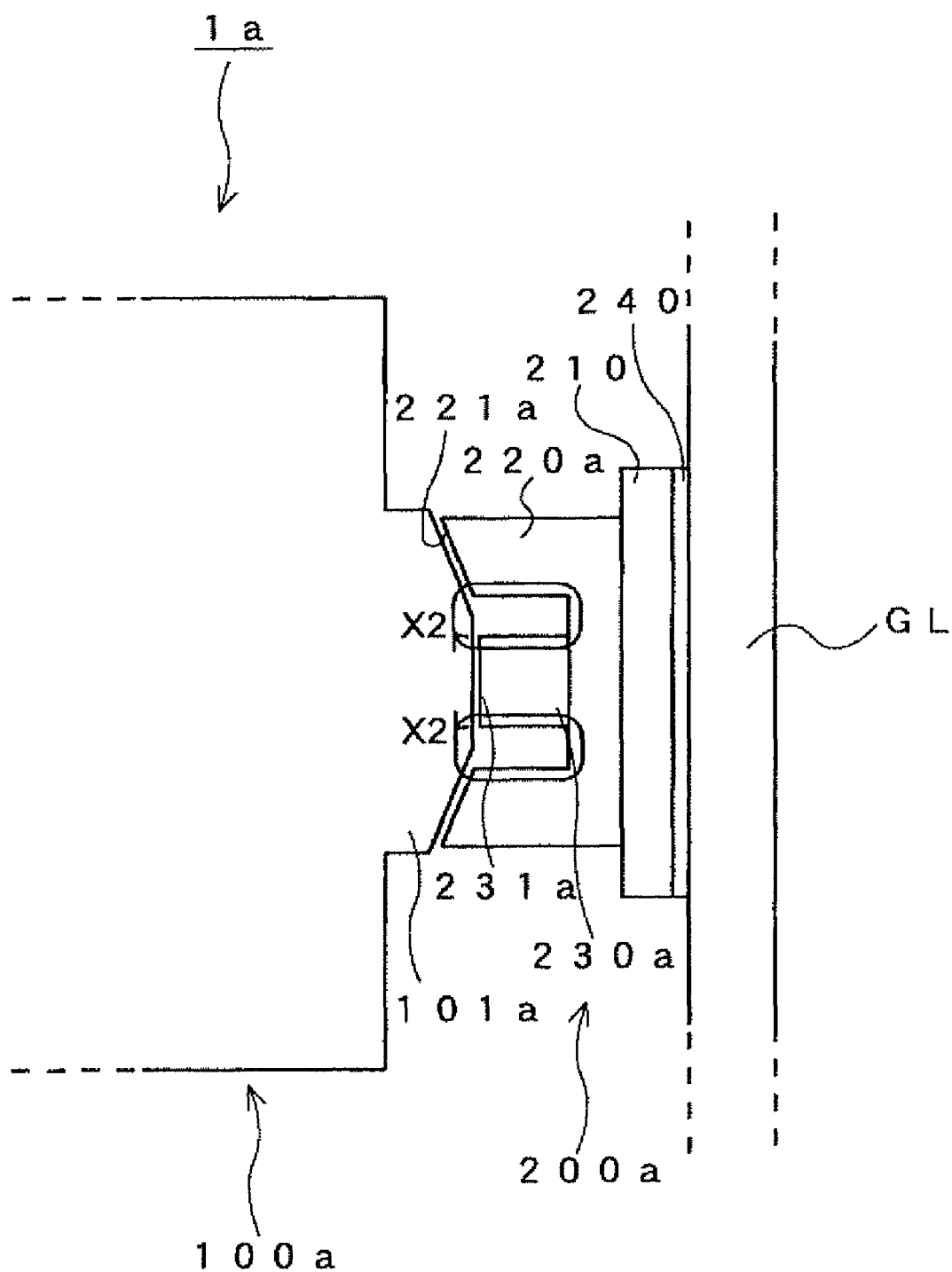
FIG. 3B is a side sectional view of a modification of the image display unit of the first embodiment.

The configurations of the convex surface of the above-mentioned image display unit 1, the guide member, and the concave surface of the magnet may also be as shown in FIG. 3B.

That is, an image display unit 1a as shown in FIG. 3B has a guide member 220a and a magnet 230a, and, further, a convex surface 101a instead of the convex surface 101.

The convex surface 101a is provided on a column protruding rearwards from the case 110, and has a truncated cone-shaped outer surface configuration.

The concave surface 221a of the guide member 220a is a surface corresponding to the convex surface 101a, and consists of a surface obtained by forming the concave surface 221 of the first embodiment as a flat surface.

The magnet 230a is an ordinary columnar magnet. The concave surface 231a, which is a surface supposed to be fixed to a part of the convex surface 101a by attraction, is not a curved surface but a flat surface. The polarity of the magnet 230a is the same as that of the first embodiment.

If the convex surface of the image display unit, the guide member, and the concave surface of the magnet are thus configured, by fixing a part of the convex surface 101a and the magnet 230a to each other by attraction, there is formed a closed-loop state of the magnetic flux from the magnet 230a to the convex surface 101a, from the convex surface 101a to the guide member 220a, and from the guide member 220a to the magnet 230a (This closed loop of the magnetic flux is indicated by reference numeral X2 in FIG. 3B). When the polarity of the magnet 230a is reversed, the magnetic flux extends from the magnet 230a to the guide member 220a, from the guide member 220a to the convex surface 101a, and from the convex surface 101a to the magnet 230a. As in the first embodiment, in this modification also, it is possible to realize a strong and stable attraction and to freely adjust the mounting angle of the image display unit main body 100a. That is, it is possible to adjust the mounting angle of the image display unit main body 100a in a desired direction, such as the vertical direction, the horizontal direction, or an oblique direction, with the image display unit main body being attached to the front surface of the eyeglass lens GL.

(Modification 2)

Figure 3C:
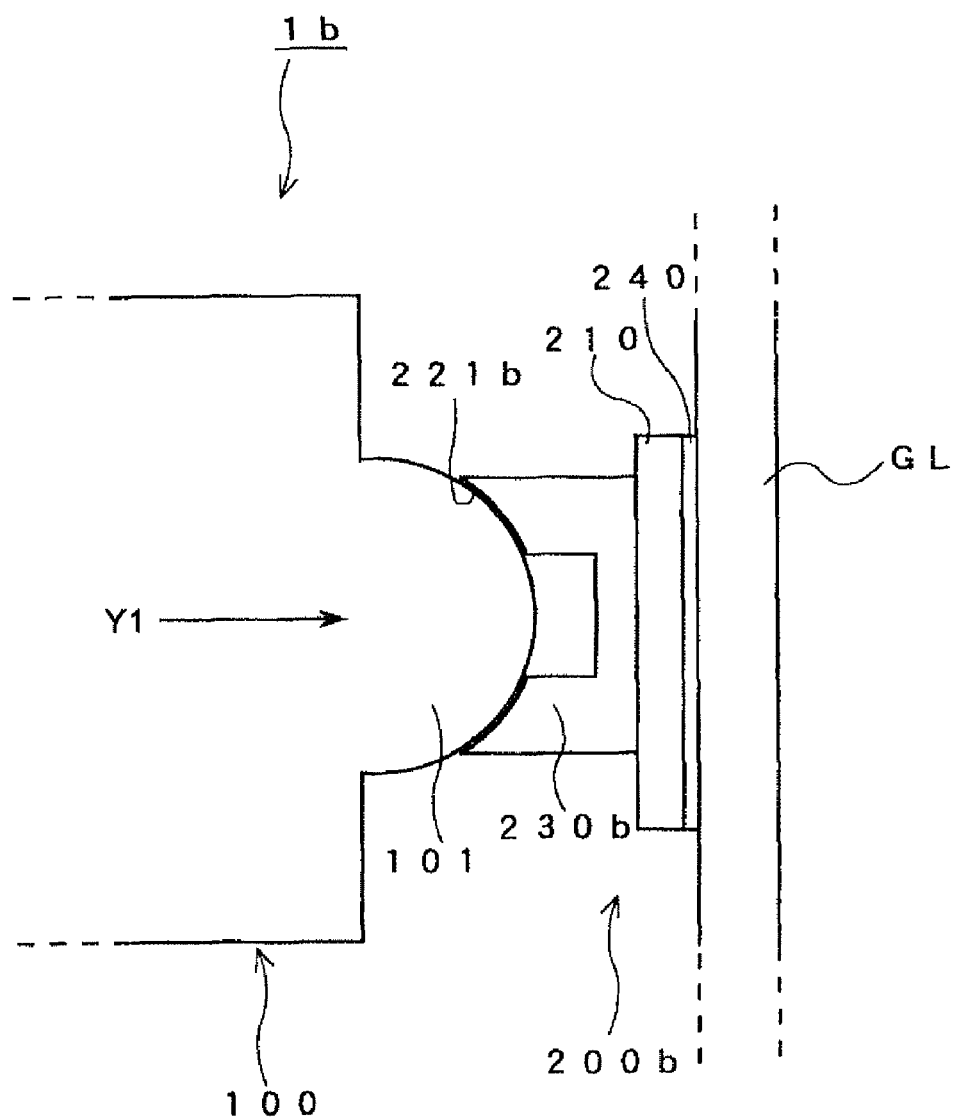
FIG. 3C is a side sectional view of a modification of the image display unit of the first embodiment.
Figure 3C:
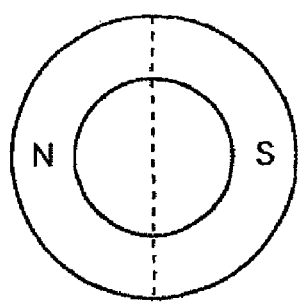
Figure 3C:
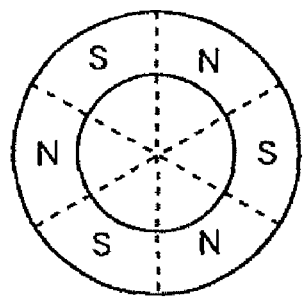

Further, it is also possible for the joint portion of the image display unit 1 to be constructed as shown in FIG. 3C.

That is, an image display unit 1b shown in FIG. 3C does not have the guide member 220 but it has a magnet 230b.

The magnet 230b is a magnet formed of substantially the same configuration as the guide member 220 of the first embodiment. That is, the magnet 230b is a cylindrical member having a bottom portion fixed to the base 210, and has at its forward end a concave surface 221b which is a curved surface corresponding to the convex surface 101 and which is supposed to come into contact with the convex surface 101 when the image display unit main body 100 and the intermediate member 200b are fixed to each other. And, with the concave surface 221b and the convex surface 101 being held in contact with each other, it is constructed so as to be possible to slide any one of the convex surface 101 and the concave surface 221b with respect to the other of the convex surface 101 and the concave surface 221b.

Here, as seen, for example, in the direction of the arrow Y1 of FIG. 3C, the magnet 230b is divided into an even number of portions of N-polarity or S-polarity by planes passing the center thereof and perpendicular to the surface at the bottom of the convex surface 101 side. The even number of portions of N-polarity or S-polarity may be of the same size. For example, as shown in portion (a) of FIG. 3C, the magnet 230*b* may be divided into two portions of N-polarity and S-polarity, respectively; or, as shown in portion (b) of FIG. 3C, it may be divided into six portions of N-polarity and S-polarity. Also in the image display unit 1*b* thus constructed, by fixing a part of the convex surface 101 and the magnet 230*b* to each other by attraction, there is formed a closed-loop state of the magnetic flux from the N-polarity portion of the concave surface 221*b* of the magnet 230*b* to the convex surface 101, from the convex surface 101 to the S-polarity portion of the concave surface 221*b* of the magnet 230*b*, and from the S-polarity portion of the concave surface 221*b* of the magnet 230*b* to the N-polarity portion of the concave surface 221*b* of the magnet 230*b* through the bottom portion of the magnet 230*b*. Thus, with this joint portion also, it is possible to effect a strong and stable attraction, making it possible to freely adjust the mounting angle of the image display unit main body 100. That is, it is possible to adjust the mounting angle of the image display unit main body 100 in a desired direction, such as the vertical direction, the horizontal direction, or an oblique direction, with the image display unit main body being attached to the front surface of the eyeglass lens GL.

(Modification 3)

Figure 3D:
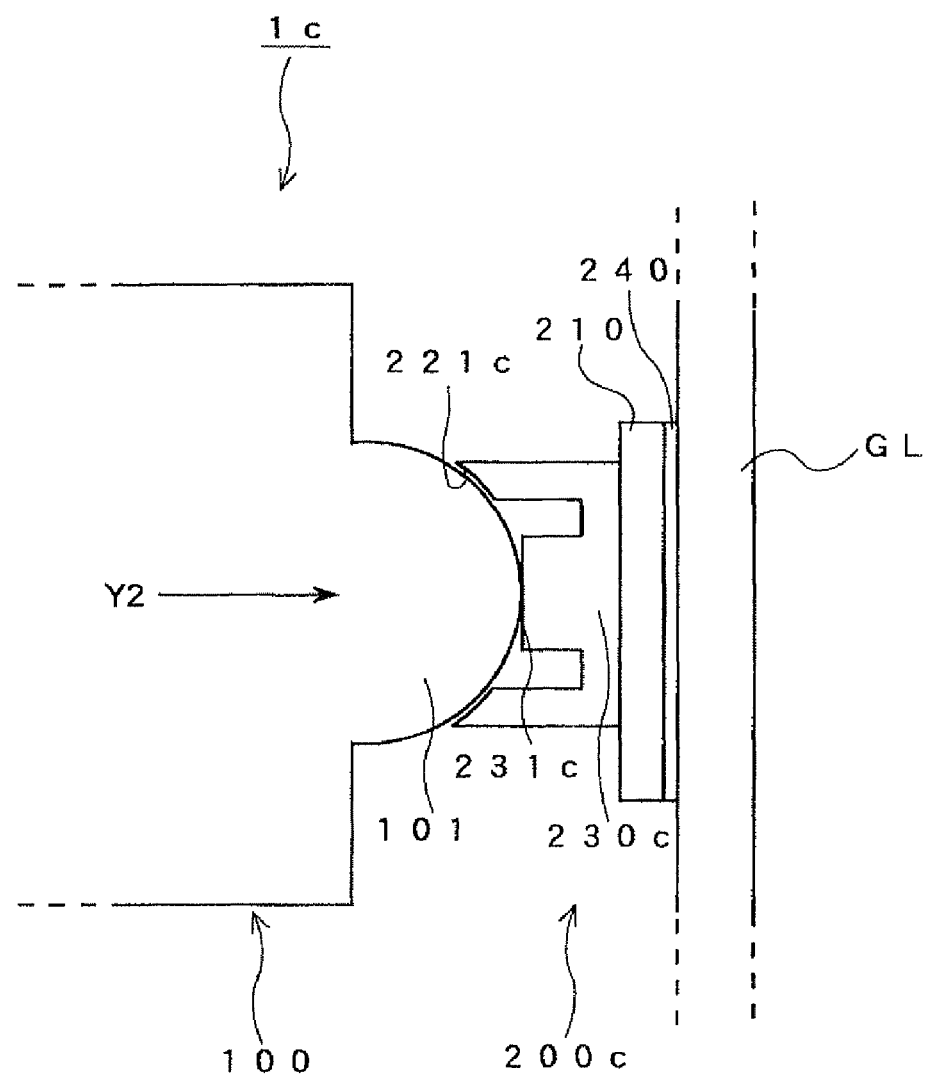
FIG. 3D is a side sectional view of a modification of the image display unit of the first embodiment.
Figure 3D:
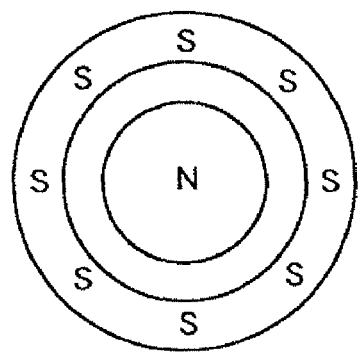

Further, the joint portion of the image display unit 1 may also be constructed as shown in FIG. 3D.

Like the image display unit 1*b*, an image display unit 1*c* shown in FIG. 3D has no guide member 220 but it has a magnet 230*c*.

The magnet 230*c* is a cylindrical member having a bottom portion fixed to the base 210, and has at its forward end a concave surface 221*c* which is a curved surface corresponding to the convex surface 101 and which is supposed to come into contact with the convex surface 101 when the image display unit main body 100 and the intermediate member 200*c* are fixed to each other. And, with the concave surface 221*c* and the convex surface 101 being held in contact with each other, it is possible to slide any one of the convex surface 101 and the concave surface 221*c* with respect to the other of the convex surface 101 and the concave surface 221*c* as in the case of the construction of the magnet 230*b* of Modification 2. However, the magnet 230*c* differs from that of Modification 2 in that it further has substantially at its center a columnar magnet to be fixed to a part of the convex surface 101 by attraction. The surface 231*c* of this columnar magnet, which is supposed to be fixed to a part of the convex surface 101 by attraction, is not a curved surface but a flat surface.

While in this embodiment the magnet 230*c* is described as an integrated one, it is also possible to form the outer side portion and the inner side portion raised from the bottom portion as separate portions. As shown in portion (a) of FIG. 3D, when seen in the direction of the arrow Y2 of FIG. 3D, the magnet 230*c* of this embodiment has a central portion of N-polarity and a peripheral portion of S-polarity. The polarity of the magnet 230*c* may be reversed.

In the image display unit 1*c* thus constructed, when a part of the convex surface 101 and the magnet 230*c* are fixed to each other by attraction, there is formed a closed-loop of the magnetic flux from the surface 231*c* of N-polarity of the magnet 230*c* to the convex surface 101, from the convex surface 101 to the concave surface 221*c* of S-polarity of the magnet 230*c*, and from the surface 221*c* of S-polarity of the magnet 230*c* to the surface 231*c* of N-polarity of the magnet 230*c* through the bottom portion of the magnet 230*c*. In the case of reversed polarity, there is formed a closed-loop state of the magnetic flux from the concave surface 221*c* of N-polarity of the magnet 230*c* to the convex surface 101, from the convex surface 101*c* to the surface 231*c* of S-polarity of the magnet, and from the surface 231*c* of S-polarity of the magnet to the concave surface 221*c* of N-polarity of the magnet 230*c* through the bottom portion of the magnet 230*c*. At all events, with this joint portion also, it is possible to effect a strong and stable attraction, making it possible to freely adjust the mounting angle of the image display unit main body 100. That is, it is possible to adjust the mounting angle of the image display unit main body 100 in a desired direction, such as the vertical direction, the horizontal direction, or an oblique direction, with the image display unit main body 100 being attached to the front surface of the eyeglass lens GL.

The above modifications are also applicable to the following embodiments.

Second Embodiment

Figure 4:
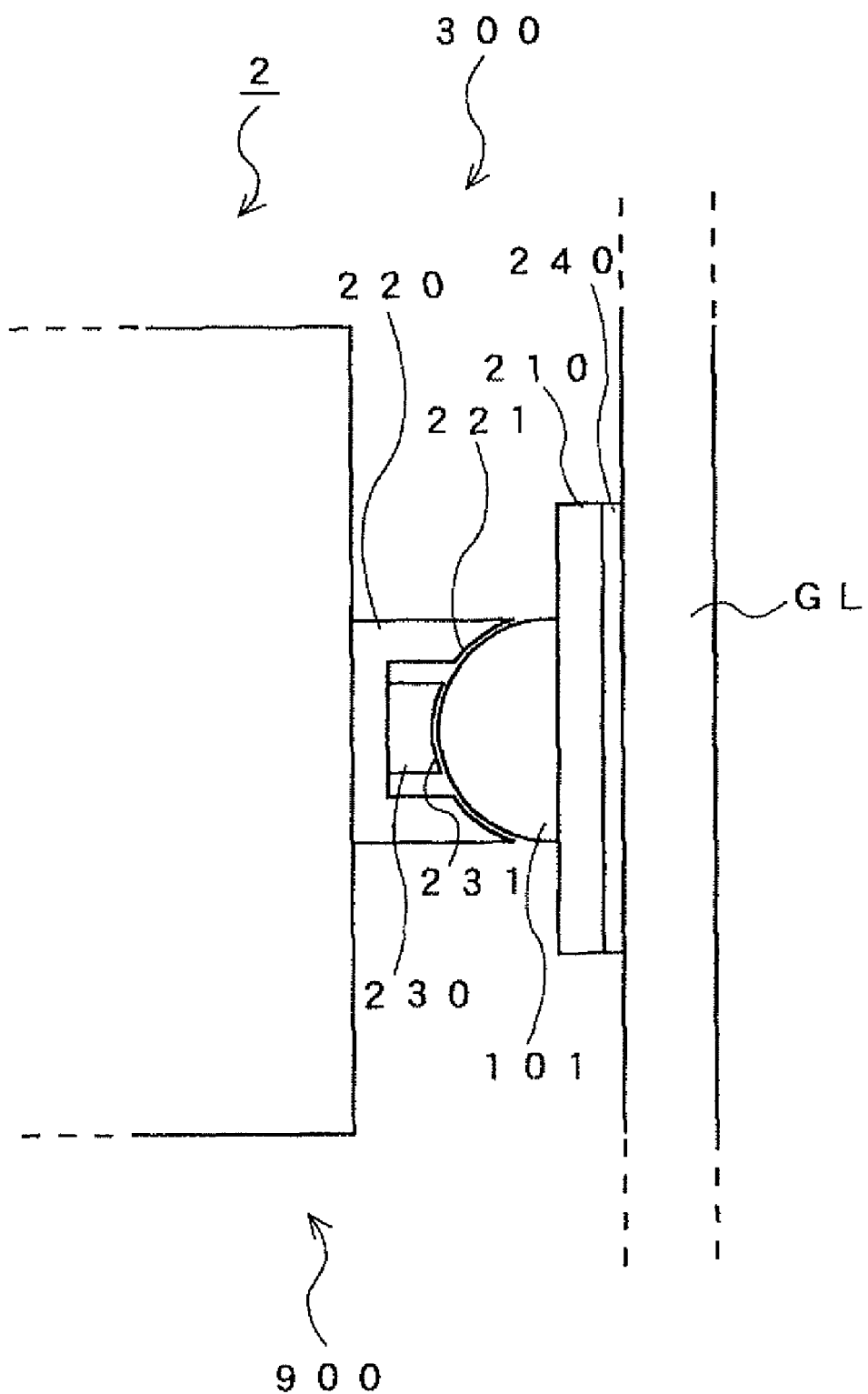
FIG. 4 is a side sectional view illustrating a state where an image display unit according to a second embodiment is in use.

FIG. 4 is a diagram showing an image display unit 2 according to this embodiment in use.

The image display unit 2 differs from the image display unit 1 of the first embodiment in the construction of the joint portion.

That is, while the above-mentioned guide member 220 is provided on the front surface of the base 210 of the intermediate member 200 of the first embodiment, an intermediate member 300 of the image display unit 2 of this embodiment has the convex surface 101 instead. The convex surface 101 protrudes toward the front of the intermediate member 300. The convex surface 101 constitutes a part of a predetermined spherical surface. While in this embodiment the convex surface 101 is formed of a ferromagnetic material, it may also be formed of a material attracted to a magnet, such as a magnet or metal.

An image display unit main body 900 used in combination with the intermediate member 300 equipped with the convex surface 101 has the guide member 220 on the rear surface thereof. The bottom portion of the guide member 220 is fixed to the rear surface of the image display unit main body 900, and the guide member 220 has the concave surface 221 open rearwards.

The magnet 230 is mounted to a position substantially the center of the bottom portion of the guide member 220, and the magnet 230 and the convex surface 101 are attracted to each other by a magnetic force.

That is, in this embodiment, the positional relationship between the convex surface 101, the guide member 220, and the magnet 230 of the first embodiment is reversed.

Also when the joint portion of this embodiment is used, by fixing a part of the convex surface 101 and the magnet 230 to each other by attraction, there is formed a closed-loop state of the magnetic flux from the magnet 230 to the convex surface 101, from the convex surface 101 to the guide member 220, and from the guide member 220 to the magnet 230 (or from the magnet 230 to the guide member 220, from the guide member 220 to the convex surface 101, and from the convex surface 101 to the magnet 230), so it is possible to effect a strong and stable attraction, making it possible to freely adjust the mounting angle of the image display unit main body 900. That is, it is possible to adjust the mounting angle of the image display unit main body 900 in a desired direction, such as the vertical direction, the horizontal direction, or an oblique direction, with the image display unit main body 900 being attached to the front surface of the eyeglass lens GL.

Third Embodiment

Figure 5:
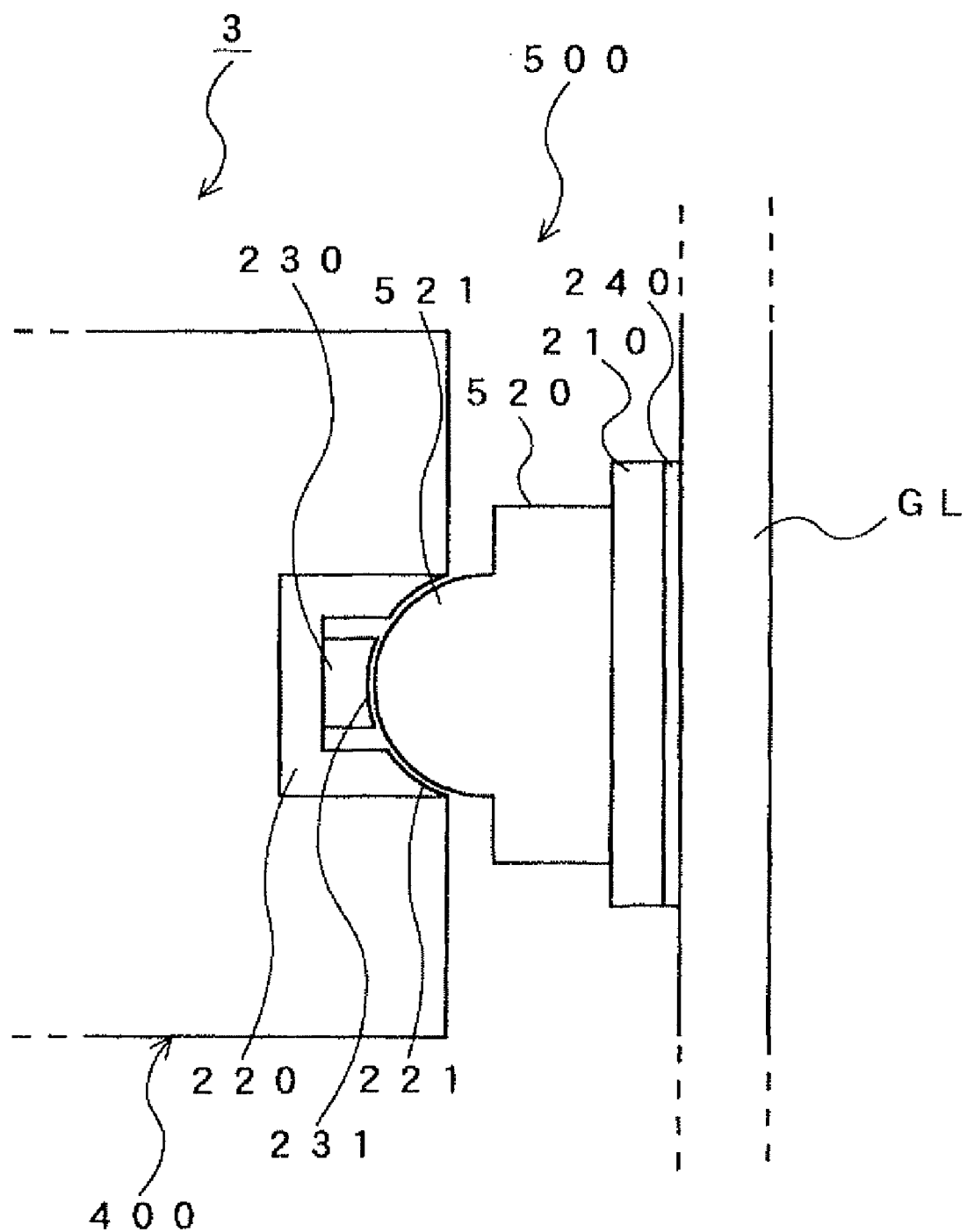
FIG. 5 is a side sectional view illustrating a state where an image display unit according to a third embodiment is in use.

FIG. 5 is a diagram showing a state of an image display unit 3 according to this embodiment in use.

The image display unit 3 of this embodiment also differs from the image display units 1, 2 of the above embodiments in the construction of the joint portion thereof.

That is, while the above-mentioned guide member 220 is provided on the front surface of the base 210 of the intermediate member 200 of the first embodiment, an intermediate member 500 of the image display unit 3 of this embodiment is equipped, instead, with a foundation 520 as shown in FIG. 5. The foundation 520 is equipped with a convex surface 521. The convex surface 521 protrudes toward the front of the intermediate member 500. The convex surface 521 constitutes a part of a predetermined spherical surface. While the convex surface 521 of this embodiment is formed of a ferromagnetic material, it may also be formed of a material attracted to a magnet, such as a magnet or metal.

An image display unit main body 400 used in combination with the intermediate member 500 equipped with the foundation 520 is equipped with the guide member 220 embedded therein so as to form the concave surface 221 on the rear surface thereof. The magnet 230 is mounted to substantially the center of the bottom portion of the guide member 220, and the magnet 230 and the convex surface 521 are attracted to each other by a magnetic force.

That is, in this embodiment, the positional relationship between the convex surface 101, the guide member 220, and the magnet 230 of the first embodiment is reversed, and the guide member 220 and the magnet 230 of the second embodiment is being embedded in the rear surface of the image display unit main body 400.

When the joint portion of this embodiment is used, by fixing a part of the convex surface 521 and the magnet 230 to each other by attraction, there is formed a closed-loop state of the magnetic flux from the magnet 230 to the convex surface 521, from the convex surface 521 to the guide member 220, and from the guide member 220 to the magnet 230 (or from the magnet 230 to the guide member 220, from the guide member 220 to the convex surface 521, and from the convex surface 521 to the magnet 230), so it is possible to effect a strong and stable attraction, making it possible to freely adjust the mounting angle of the image display unit main body 400. That is, it is possible to adjust the mounting angle of the image display unit main body 400 in a desired direction, such as the vertical direction, the horizontal direction, or an oblique direction, with the image display unit main body 400 being attached to the front surface of the eyeglass lens GL.

Fourth Embodiment

Figure 6:
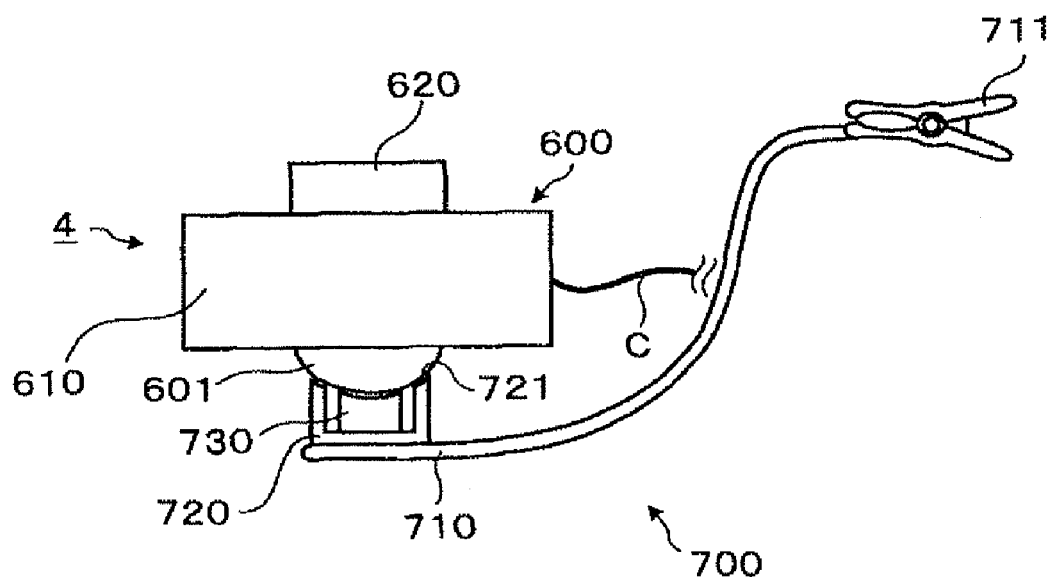
FIG. 6 is a diagram showing how an image display unit main body of an image display unit according to a fourth embodiment is attached to an intermediate member.
Figure 7:
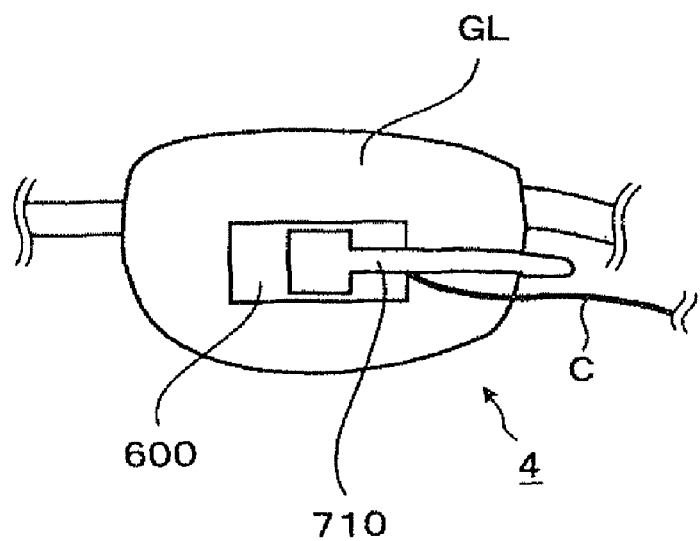
FIG. 7 is a side sectional view illustrating a state where the image display unit of the fourth embodiment is in use.

FIG. 6 shows an image display unit 4 according to this embodiment FIG. 7 is a diagram showing the image display unit 4 of this embodiment in use.

The image display unit 4 is the same as the image display unit 1 of the first embodiment in the construction of the joint portion thereof, but it differs therefrom in the construction of an image display unit main body 600 and of an intermediate member 700.

That is, while in the image display unit main body 100 of the first embodiment the convex surface 101 is provided on the rear surface of the case 110 together with the lens barrel 120, but in the image display unit main body 600 of this embodiment, as shown in FIG. 6, only a lens barrel 620 is provided on the rear surface of a case 610, with a convex surface 601 being provided on the front surface of the case 610.

Further, while the intermediate member 200 of the first embodiment is constructed so as to be capable of being detachably fixed to the flat surface of the eyeglass lens GL, an intermediate member 700 according to this embodiment is constructed so as to be capable of being detachably fixed to the peripheral edge portion of the eyeglass lens GL.

More specifically, as shown in FIG. 6, the intermediate member 700 is equipped with a plate-like member 710 with two ends, a guide member 720 protruding from the rear surface at one end portion of the member 710 to the rear surface thereof, and a magnet 730.

The guide member 720 and the magnet 730 are the same members as the guide member 220 and the magnet 230 of the first embodiment. The bottom portion of the guide member 720 is fixed to the member 710.

As shown in FIG. 7, one end portion of the member 710 to which the guide member 720 is mounted has a large width, and the remaining portion thereof has a small width. Further, the portion of the member 710 extending from one end to the other end thereof is curved rearwards, and a clip 711 for fixing the intermediate member 700 to the peripheral edge portion of the eyeglass lens GL is formed at the other end thereof. The member 710 is constructed such that when the image display unit 4 is attached to the peripheral edge portion of the eyeglass lens GL as will be described below, the image display unit main body 600 is situated substantially in front of the center of the eyeglass lens GL.

While in this embodiment the guide member 720 is constructed as described above, it may also be constructed so as to be capable of being detachably fixed to at least a part of the eyeglass frame instead of to the peripheral edge portion of the eyeglass lens GL.

Next, the attachment of the image display unit main body 600 to the peripheral edge portion of the eyeglass lens GL when using the above image display unit 4 will be described.

When performing this attachment, the image display unit main body 600 is first attached to the intermediate member 700. As shown in FIG. 6, when performing this attachment, the convex surface 601 of the image display unit main body 600 is brought close to the concave surface 721 of the guide member 720, and the magnet 730 and the convex surface 601 are attracted to each other by a magnetic force.

Next, the intermediate member 700 is attached to the peripheral edge portion of the eyeglass lens GL. This attachment is performed by holding in the peripheral edge portion of the eyeglass lens GL by the clip 711.

In this way, the image display unit main body 600 is fixed to the front side of the eyeglass lens GL through the intermediation of the intermediate member 700.

FIG. 7 is a diagram showing the state of the image display unit 4 as mounted to the peripheral edge portion of the eyeglass lens GL as described above. As shown in the drawing, when the intermediate member 700 is fixed to the peripheral edge portion of the eyeglass lens GL by holding in the peripheral edge portion of the eyeglass lens GL by the clip 711, the image display unit main body 600 attached to the intermediate member 700 is situated in front of substantially the center of the eyeglass lens GL.

Also when the image display unit 4 of this embodiment is used, a part of the convex surface 601 and the magnet 730 are attracted to each other, whereby there is formed a closed-loop state of the magnetic flux as mentioned above, so it is possible to realize a strong and stable attraction and to freely adjust the mounting angle of the image display unit main body 600.

That is, it is possible to adjust the mounting angle of the image display unit main body 600 in a desired direction, such as the vertical direction, the horizontal direction, or an oblique direction, with the image display unit main body being attached to the front surface of the eyeglass lens GL.

While in this embodiment the image display unit main body 600 has the convex surface 601, and the intermediate member 700 has the concave surface 721, it is also possible for the universal joint portion to be constructed as in the second embodiment and the third embodiment.

While in the above, preferred embodiments in each of which the universal joint of the present invention is applied to an image display unit have been described, but this universal joint can be used not only in an image display unit but also in connecting together two members of various kinds.

The invention claimed is:

1. A universal joint, comprising:
   a first member; and
   a second member which is detachable with respect to the first member and a mounting angle of which with respect to the first member can be adjusted,
   wherein the first member has a convex surface constituting a part of a predetermined substantially spherical surface, and is generally formed in a thin plate-like configuration having a small thickness in a radial direction of the substantially spherical surface forming the convex surface,
   wherein the second member has:
       a guide member of a magnetic permeability higher than that of air having a concave surface substantially corresponding to the convex surface and supposed to come into contact with the convex surface when the first member and the second member are fixed to each other, one of the convex surface and the concave surface being slidable with respect to another one of the convex surface and the concave surface, with the concave surface and the convex surface being held in contact with each other; and
       a magnet provided at a position substantially the center of the guide member and capable of being detachably fixed to at least a part of the convex surface by attraction, and
   wherein, by sliding one of the convex surface and the concave surface with respect to the another one of the convex surface and the concave surface, with the magnet being fixed to the convex surface by attraction, it is possible to adjust the mounting angle of one of the first member and the second member with respect to another one of the first member and the second member.

2. A universal joint according to claim 1,
   wherein the guide member included in the second member is a substantially cylindrical member one end of which has the concave surface, and
   wherein the magnet is provided substantially in the axis of the guide member.

3. A universal joint according to claim 2,
   wherein the substantially cylindrical member has a bottom portion, and
   wherein the magnet is fixed to the convex surface by attraction at a position substantially the center of the bottom portion.

4. A universal joint according to claim 1,
   wherein the convex surface comprises a convex curved surface constituting a part of a predetermined spherical surface, and
   wherein the concave surface comprises a concave curved surface corresponding to the convex curved surface.

5. A universal joint according to claim 4, wherein the magnet has a concave curved surface which corresponding to the convex curved surface and which is supposed to come into contact with the convex curved surface when the first member and the second member are fixed to each other.

6. A universal joint according to claim 1,
   wherein the convex surface comprises a surface having a truncated-cone-shaped outer side configuration, and
   wherein the concave surface comprises a surface corresponding to the convex surface.

7. An image display unit, which is attached to an eyeglass lens, which is a lens of an eyeglass which is worn by a user, to be used, comprising:
   an intermediate member that can be fixed to a smooth surface of the eyeglass lens; and
   an image display unit main body which is situated in front of one eye of the user when the image display unit is in use, including:
       a display means which guides image light of a predetermined image to the one eye to make it possible to watch the image with the one eye in a state in which the image exists within a display range that is a part of a field of vision of the one eye; and
       a fixing means enabling the image display unit main body to be detachably fixed to the intermediate member,
   wherein the intermediate member comprises one of the first member and the second member according to claim 1, and
   wherein the fixing means comprises another one of the first member and the second member according to claim 1.

8. An image display unit, which is attached to an eyeglass lens, which is a lens of an eyeglasses which is worn by a user or to an eyeglass frame which is a frame of the eyeglasses, to be used, comprising:
   an intermediate member that can be detachably fixed to a peripheral edge portion of the eyeglass lens or to at least a part of the eyeglass frame; and
   an image display unit main body which is situated in front of one eye of the user when the image display unit is in use, including:
       a display means which guides image light of a predetermined image to the one eye to make it possible to watch the image with the one eye in a state in which the image exists within a display range that is a part of a field of vision of the one eye; and
       a fixing means enabling the image display unit main body to be detachably fixed to the intermediate member,
   wherein the intermediate member comprises one of the first member and the second member according to claim 1, and
   wherein the fixing means comprises another one of the first member and the second member according to claim 1.

9. A universal joint, comprising:
   a first member; and
   a second member which is detachable with respect to the first member and a mounting angle of which with respect to the first member can be adjusted,
   wherein the first member has a convex surface constituting a part of a predetermined substantially spherical surface and is formed of a material attracted to a magnet, and is generally formed in a thin plate-like configuration having a small thickness in a radial direction of the substantially spherical surface forming the convex surface, wherein the second member has:
a guide member of a magnetic permeability higher than that of air having a concave surface substantially corresponding to the convex surface and supposed to come into contact with the convex surface when the first member and the second member are fixed to each other, one of the convex surface and the concave surface being slidable with respect to another one of the convex surface and the concave surface, with the concave surface and the convex surface being held in contact with each other; and
a magnet provided at a position substantially the center of the guide member and capable of being detachably fixed to at least a part of the convex surface by attraction,
wherein when the magnet is fixed to the convex surface by attraction, there is formed a closed-loop state of a magnetic flux from the magnet to the convex surface, from the convex surface to the guide member, and from the guide member to the magnet, or a closed-loop state of a magnetic flux from the magnet to the guide member, from the guide member to the convex surface, and from the convex surface to the magnet, and
wherein, by sliding one of the convex surface and the concave surface with respect to the another one of the convex surface and the concave surface, with the magnet being fixed to the convex surface by attraction, it is possible to adjust the mounting angle of one of the first member and the second member with respect to another one of the first member and the second member.

10. A universal joint, comprising:
a first member; and
a second member which is detachable with respect to the first member and a mounting angle of which with respect to the first member can be adjusted,
wherein the first member has a convex surface constituting a part of a predetermined substantially spherical surface and is formed of a material attracted to a magnet, and is generally formed in a thin plate-like configuration having a small thickness in a radial direction of the substantially spherical surface forming the convex surface,
wherein the second member has a cylindrical magnet which has a bottom surface and whose upper surface substantially corresponds to the convex surface and is a concave surface that can be detachably fixed by attraction to the convex surface when the first member and the second member are fixed to each other, one of the convex surface and the concave surface being slidable with respect to another one of the convex surface and the concave surface, with the concave surface and the convex surface being held in contact with each other,
wherein when the magnet is fixed to the convex surface by attraction, there is formed a closed-loop state of a magnetic flux from the concave surface of the magnet to the convex surface, from the convex surface to the concave surface of the magnet, from the concave surface of the magnet to the bottom surface of the magnet, and from the bottom surface of the magnet to the concave surface of the magnet, and
wherein, by sliding one of the convex surface and the concave surface with respect to the another one of the convex surface and the concave surface, with the magnet being fixed to the convex surface by attraction, it is possible to adjust the mounting angle of one of the first member and the second member with respect to another one of the first member and the second member.

11. A universal joint, comprising:
a first member; and
a second member which is detachable with respect to the first member and a mounting angle of which with respect to the first member can be adjusted,
wherein the first member has a convex surface constituting a part of a predetermined substantially spherical surface and is formed of a material attracted to a magnet, and is generally formed in a thin plate-like configuration having a small thickness in a radial direction of the substantially spherical surface forming the convex surface,
wherein the second member has:
a first magnet that is a cylindrical magnet which has a bottom surface and whose upper surface substantially corresponds to the convex surface and is a concave surface that can be detachably fixed by attraction to the convex surface when the first member and the second member are fixed to each other, one of the convex surface and the concave surface being slidable with respect to another one of the convex surface and the concave surface, with the concave surface and the convex surface being held in contact with each other; and
a second magnet provided at a position substantially the center of the first magnet and capable of being detachably fixed by attraction to a part of the convex surface,
wherein when the first magnet and the second magnet are fixed to the convex surface by attraction, there is formed a closed-loop state of a magnetic flux from the first magnet to the convex surface, from the convex surface to the second magnet, and from the second magnet to the first magnet, or a closed-loop state of a magnetic flux from the first magnet to the second magnet, from the second magnet to the convex surface, and from the convex surface to the first magnet, and
wherein, by sliding one of the convex surface and the concave surface with respect to another one of the convex surface and the concave surface, with the first magnet and the second magnet being fixed to the convex surface by attraction, it is possible to adjust the mounting angle of one of the first member and the second member with respect to another one of the first member and the second member.

* * * * *